(12) United States Patent
Schorr

(10) Patent No.: US 12,523,054 B2
(45) Date of Patent: Jan. 13, 2026

(54) UMBRELLA HOLDING DEVICE

(71) Applicant: Gary J. Schorr, Mesa, AZ (US)

(72) Inventor: Gary J. Schorr, Mesa, AZ (US)

( * ) Notice: Subject to any disclaimer, the term of this patent is extended or adjusted under 35 U.S.C. 154(b) by 0 days.

(21) Appl. No.: 18/811,948

(22) Filed: Aug. 22, 2024

(65) Prior Publication Data

US 2025/0067078 A1  Feb. 27, 2025

Related U.S. Application Data

(60) Provisional application No. 63/534,054, filed on Aug. 22, 2023.

(51) Int. Cl.
*E04H 12/22* (2006.01)
*F16B 7/14* (2006.01)

(52) U.S. Cl.
CPC ......... *E04H 12/2269* (2013.01); *F16B 7/149* (2013.01)

(58) Field of Classification Search
CPC .............................. E04H 12/2269; F16B 7/149
USPC ......................................................... 248/412
See application file for complete search history.

(56) References Cited

U.S. PATENT DOCUMENTS

| | | | | |
|---|---|---|---|---|
| 1,970,624 A * | 8/1934 | Recker | ..................... | F21V 21/22 |
| | | | | 248/412 |
| 2,496,402 A * | 2/1950 | Mcveigh | ................. | D02H 13/28 |
| | | | | 285/55 |
| 4,277,197 A * | 7/1981 | Bingham | ................ | F16B 7/149 |
| | | | | 403/104 |
| 5,011,104 A * | 4/1991 | Fang | ...................... | F16M 11/28 |
| | | | | 248/161 |
| 5,649,780 A * | 7/1997 | Schall | ...................... | B25G 1/04 |
| | | | | 403/109.5 |
| 5,752,349 A * | 5/1998 | Fitzsimmons | ....... | A63B 71/023 |
| | | | | 52/165 |
| 6,300,569 B1 * | 10/2001 | Mullen, Jr. | .............. | H02G 3/18 |
| | | | | 248/74.1 |
| 6,332,734 B1 * | 12/2001 | Hebert | ................. | B23B 31/202 |
| | | | | 403/368 |

(Continued)

FOREIGN PATENT DOCUMENTS

| | | | | | |
|---|---|---|---|---|---|
| CA | 2114578 C | * | 4/1999 | ......... | E04H 12/2269 |
| CH | 373888 A | * | 12/1963 | ......... | E04H 12/2269 |

(Continued)

OTHER PUBLICATIONS

CN 106286514—Machine Translation (Year: 2017).*
DE 202009014282—Machine Translation (Year: 2009).*

*Primary Examiner* — Taylor Morris
(74) *Attorney, Agent, or Firm* — Accelerate IP LLC

(57) ABSTRACT

An umbrella holding device designed for secure placement in a hole on a patio, porch, or pool deck. The device comprises a grip nut, a base, and a ferrule. The grip nut features a grip exterior and interior, with the interior partially threaded. The base has a grip portion and a patio extension, with the patio extension designed to fit into the patio hole and the grip portion configured to engage with the grip nut thread. The base interior is substantially funnel-shaped. The ferrule, which can be inserted into the grip hollow, has a top and at least one tang. When the threaded exterior portion engages the grip nut thread, the ferrule is pushed into the base interior, and the funnel-shaped base interior exerts inward pressure on the ferrule.

12 Claims, 7 Drawing Sheets

(56) References Cited

U.S. PATENT DOCUMENTS

| | | | | |
|---|---|---|---|---|
| 6,953,180 | B1* | 10/2005 | Ruvalcaba | E04H 12/2269 248/530 |
| 7,150,579 | B2* | 12/2006 | Newton | E04H 12/2269 403/372 |
| 7,437,857 | B1* | 10/2008 | Maguire | E02D 5/80 52/297 |
| 7,966,772 | B2* | 6/2011 | Bartels | E02D 17/04 52/298 |
| 8,117,787 | B2* | 2/2012 | Lee | E04G 25/061 403/109.5 |
| 8,422,716 | B2* | 4/2013 | Wetzel | F16B 7/14 403/109.5 |
| 10,352,061 | B2* | 7/2019 | Geslin | E04H 12/2269 |
| 11,427,980 | B1* | 8/2022 | Kimrey | E04H 17/08 |
| 2003/0205647 | A1* | 11/2003 | Boucher | A01G 17/04 248/156 |
| 2015/0000716 | A1* | 1/2015 | LeAnna | E04H 12/2284 248/514 |
| 2016/0077412 | A1* | 3/2016 | Nakatani | F16M 11/26 403/377 |
| 2016/0312490 | A1* | 10/2016 | McDowell | H02B 13/025 |
| 2017/0016466 | A1* | 1/2017 | Kim | F16B 7/149 |
| 2021/0076790 | A1* | 3/2021 | LeAnna | A45B 25/08 |
| 2021/0156165 | A1* | 5/2021 | Rogers | E04H 12/2223 |
| 2022/0243490 | A1* | 8/2022 | Bernabeo | A47G 25/0664 |
| 2022/0333398 | A1* | 10/2022 | Pierman | E04H 12/2269 |
| 2023/0003047 | A1* | 1/2023 | Hostert | A47B 37/04 |
| 2025/0067077 | A1* | 2/2025 | Pilarczyk | E04H 12/2269 |

FOREIGN PATENT DOCUMENTS

| | | | | | |
|---|---|---|---|---|---|
| CN | 101346576 | A | * | 1/2009 | F16B 7/149 |
| CN | 202165361 | U | * | 3/2012 | F16M 11/28 |
| CN | 106286514 | A | * | 1/2017 | F16B 7/149 |
| CN | 107227880 | A | * | 10/2017 | E04H 12/22 |
| CN | 110410391 | A | * | 11/2019 | F16M 11/28 |
| CN | 116211039 | A | * | 6/2023 | A45B 25/00 |
| DE | 19540201 | A1 | * | 4/1997 | E04H 12/2269 |
| DE | 102004020780 | A1 | * | 11/2005 | E04H 12/2223 |
| DE | 202009014282 | U1 | * | 12/2009 | E04H 12/2215 |
| DE | 202022105764 | U1 | * | 10/2022 | A45B 25/00 |
| EP | 0105882 | B1 | * | 7/1987 | F16B 2/14 |
| FR | 2687714 | A1 | * | 8/1993 | F16B 9/054 |
| GB | 2292179 | A | * | 2/1996 | F16B 7/149 |
| JP | H0736236 | Y2 | * | 8/1995 | F16B 7/149 |
| KR | 100648419 | B1 | * | 11/2006 | E04H 12/2269 |
| KR | 200433073 | Y1 | * | 12/2006 | E04H 12/2269 |
| KR | 20070013544 | A | * | 1/2007 | E04H 12/2238 |
| KR | 100979817 | B1 | * | 9/2010 | E04G 25/06 |
| KR | 20140104188 | A | * | 8/2014 | E04H 12/2284 |
| WO | WO-2019212340 | A2 | * | 11/2019 | E04H 12/2269 |
| WO | WO-2022269560 | A1 | * | 12/2022 | E04H 12/2269 |

* cited by examiner

SECTION A-A

UMBRELLA HOLDING DEVICE

CROSS REFERENCE

This application claims benefit from U.S. Provisional Application No. 63/534,054 titled "Umbrella Holding Device" and having a filing date of Aug. 22, 2024, all of which is incorporated by reference herein.

FIELD OF THE INVENTION

The present specification relates generally to a device for holding an umbrella and more particularly a umbrella holding device that securely holds an umbrella in hole that is on a patio, deck or pool deck.

BACKGROUND OF THE INVENTION

Various methods and devices have been developed in the field of outdoor accessories to secure umbrellas in outdoor environments. While traditional solutions have provided means of anchoring and supporting umbrellas, they often suffer from limitations in terms of portability, stability, and ease of use. Traditional methods of securing umbrellas in outdoor settings often involve heavy stands or bases, which can be cumbersome to transport and set up. These stands may also limit the mobility of users by confining them to specific areas, such as patios, decks or pool decks. Moreover, the complexity of assembly and disassembly, especially for larger umbrellas, presents challenges for users seeking a hassle-free outdoor experience.

In response to these challenges, various umbrella holders have been introduced in the market. Some of these holders rely on clamping mechanisms that attach to existing fixtures, such as tables or railings. While these designs offer convenience, they are restricted to specific locations and may not provide the desired stability in various ground conditions. One common approach to securing umbrellas outdoors involves the use of stands or bases that provide a stable foundation. These stands are usually made of heavy materials, such as metal or concrete, to counterbalance the weight of the umbrella and provide stability. While effective, these stands can be bulky and challenging to transport, limiting their utility in situations where portability is essential. Furthermore, the assembly and disassembly of these stands can be time-consuming and inconvenient for users seeking a quick setup.

Another category of umbrella holders includes clamp-on designs that attach to existing structures such as tables, railings, or fences. These holders offer convenience by leveraging pre-existing fixtures to support the umbrella. However, these solutions are location-dependent and often require specific fixtures to be available. Additionally, their suitability is limited to environments where compatible fixtures are present, restricting their versatility. Certain umbrella holders rely on anchors or stakes that are driven into the ground to secure the umbrella. While these solutions offer improved portability compared to traditional stands, they can face challenges in terms of stability, particularly in loose or sandy soil. Additionally, many of these designs lack adaptability to accommodate different umbrella sizes and may not provide the desired stability during inclement weather conditions.

Common shortcomings across existing umbrella holder designs include limitations in adaptability to diverse ground conditions, cumbersome assembly procedures, and constraints in providing both portability and stability simultaneously. Users often find it challenging to strike a balance between convenience and performance when selecting an umbrella holder solution that suits their needs.

As a result, there exists a need for a novel umbrella holder design that offers a practical solution to securely and conveniently anchor umbrellas in various outdoor settings, while overcoming the limitations of existing solutions.

BRIEF SUMMARY OF THE INVENTION

The present invention generally comprises an umbrella holding device designed to secure an umbrella in a hole on a patio, porch, or pool deck. The holding device includes a grip nut, a base, and a ferrule. The grip nut can have a grip exterior, a grip interior that defines a grip hollow, and a shoulder extending from the grip exterior into the grip hollow. The base can have a grip portion on a grip end and a patio extension on a patio end, with the patio extension configured to be received in the patio hole. The ferrule can be configured to be inserted into the grip hollow such that the ferrule top engages the shoulder.

The invention can also include a tang extending from the ferrule top to substantially near a ferrule bottom, and the ferrule has a throat and at least one groove substantially near the throat. The tang can be substantially angled to correspond with the funnel-shaped base interior. The ferrule can be composed of a flexible material that expands outward when inward pressure is exerted by the funnel-shaped base interior.

The invention can further include a grip with at least one grip extrusion spaced around the outer circumference of the grip, and a locking mechanism to prevent unintended loosening of the device once secured. The funnel-shaped base interior can be lined with a friction-enhancing material to increase the grip on the ferrule. The ferrule can be replaceable to accommodate different size umbrellas. The grip nut and the base can be manufactured from at least one of plastic, stainless steel, aluminum, ceramic, and composite. The ferrule can be manufactured from Delrin, silicone, plastic, stainless steel, aluminum, ceramic, and composite.

The invention can also include a detachable cap for covering the patio extension when the umbrella holding device is not in use, preventing debris from entering the patio hole. The threaded exterior portion of the grip portion can include a self-locking thread to prevent loosening due to vibration or wind movement. The device can further comprise a drainage channel within the base to allow water to escape from the patio hole, preventing accumulation around the umbrella pole.

The invention, along with the various features of novelty which characterize the invention, are pointed out with particularity in the claims annexed to and forming a part of this disclosure.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of molding a . . . , step for performing the function of molding a . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
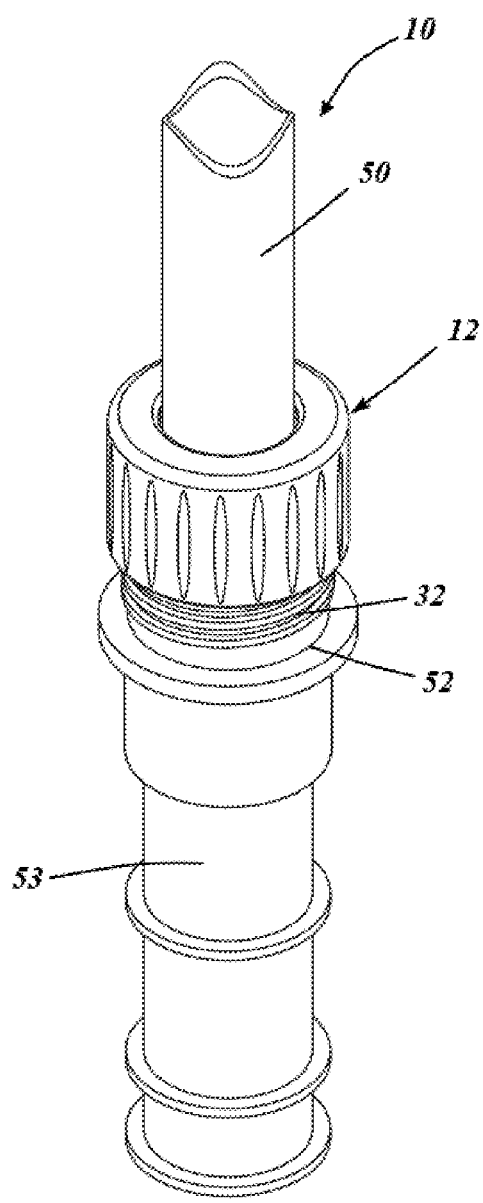
FIG. 1 is an isometric view of the umbrella holding device in a hole on a patio, porch or pool deck in accordance to one, or more embodiments.
Figure 2:
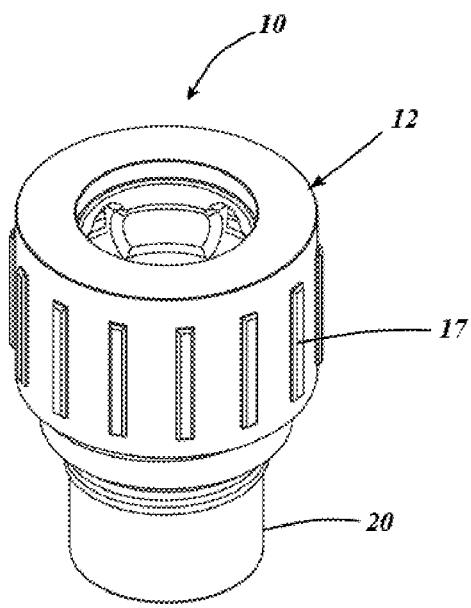
FIG. 2 is an isometric view of the umbrella holding device in accordance to one, or
more embodiments.
Figure 3:
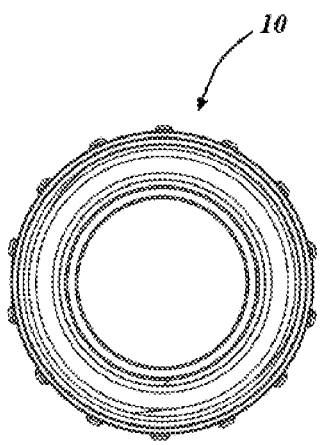
FIG. 3 is a bottom view of the umbrella holding device in accordance to one, or more embodiments.
Figure 4A:
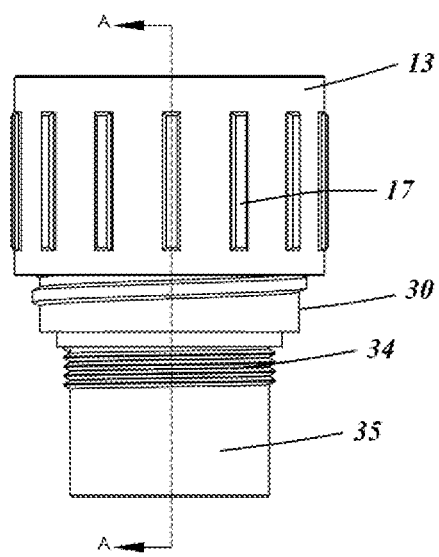
FIG. 4a is a side view of the umbrella holding device in accordance to one, or more embodiments.
Figure 4B:
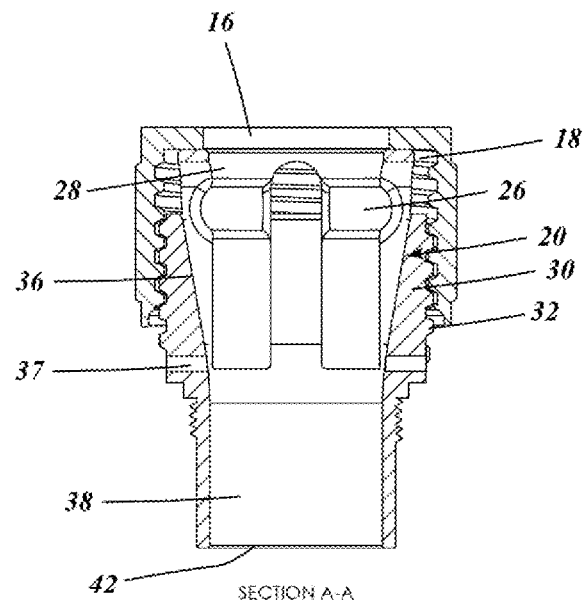
FIG. 4b is a cross-sectional view of FIG. 4a of the umbrella holding device in accordance to one, or more embodiments.
Figure 5:
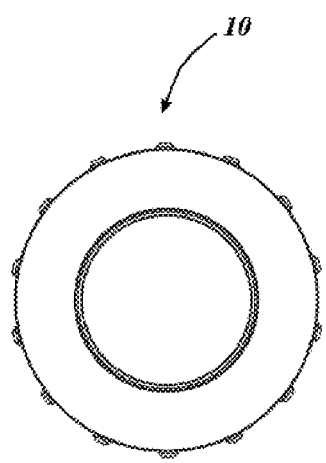
FIG. 5 is a top view of the umbrella holding device in accordance to one, or more embodiments.
Figures 6A, 6B:
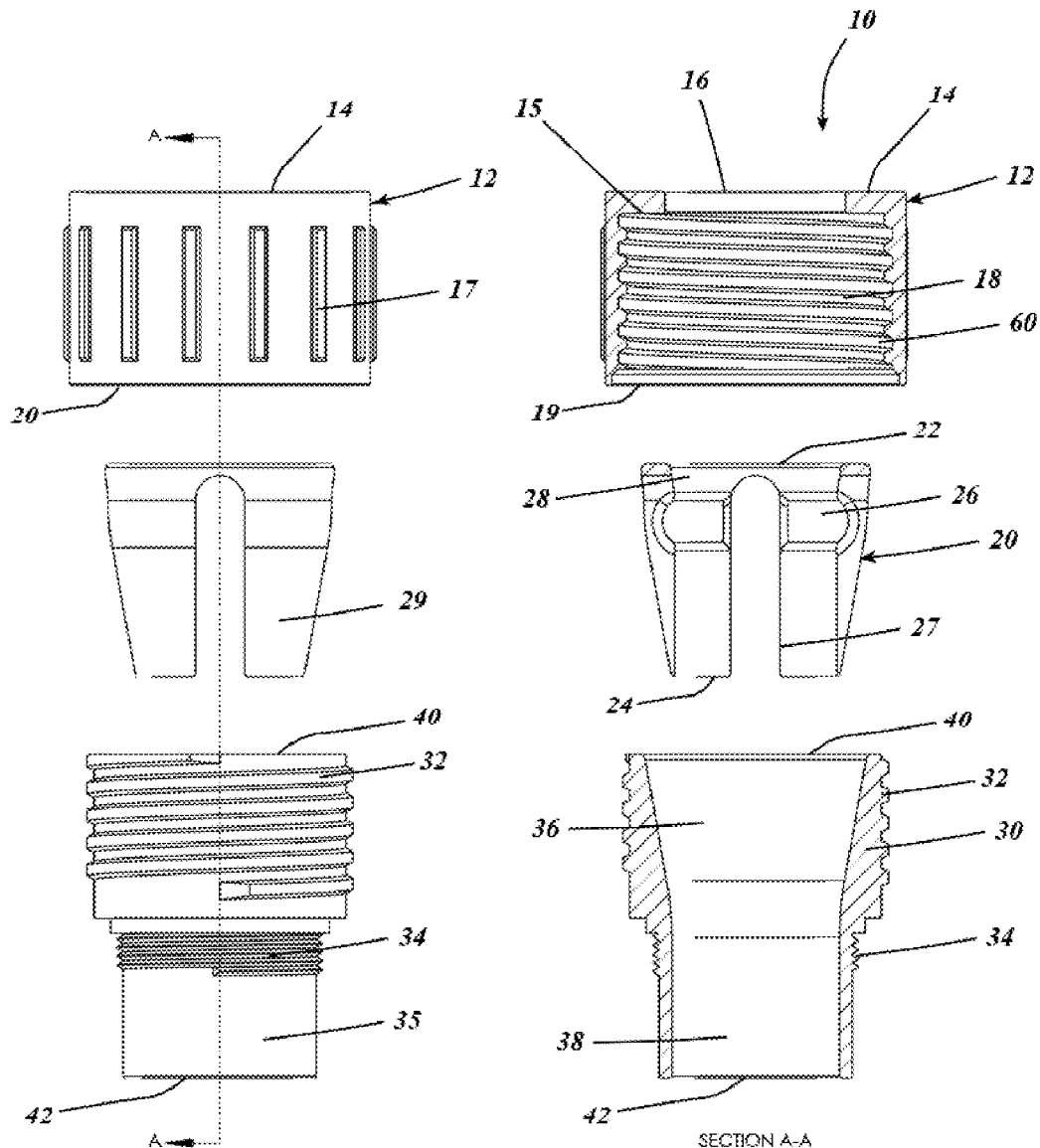
FIG. 6a is an exploded side view of the umbrella holding device in accordance to one, or more embodiments.
FIG. 6b is an exploded cross-sectional view of FIG. 6a of the umbrella holding device in accordance to one, or more embodiments.
Figure 7:
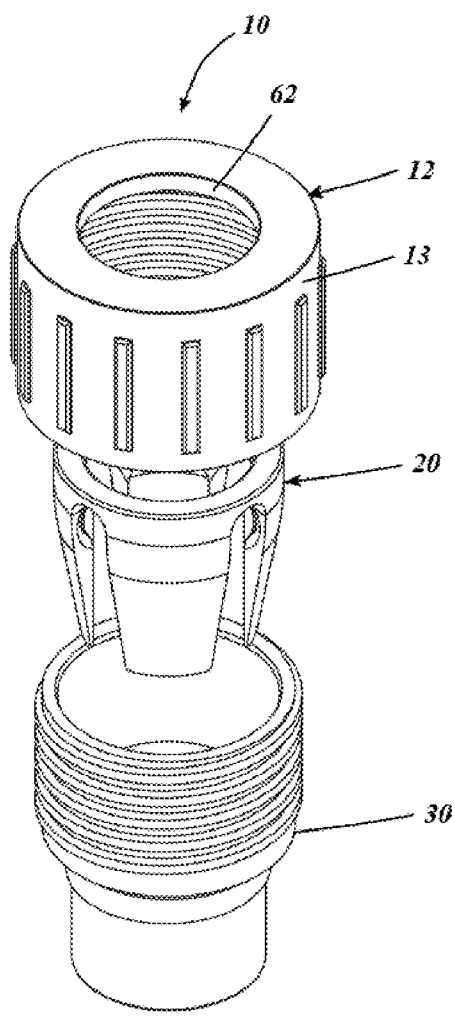
FIG. 7 is an isometric exploded view of the umbrella holding device in accordance to one, or more embodiments.
Figure 8A:
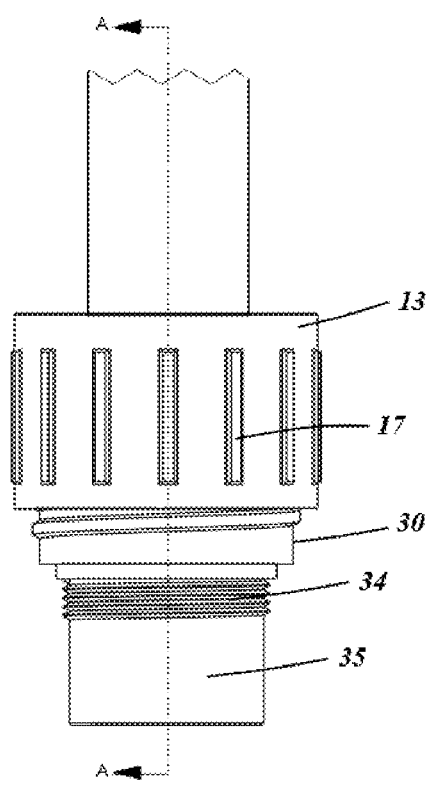
FIG. 8a is a side view of the umbrella holding device in a hole in accordance to one, or more embodiments.
Figure 8B:
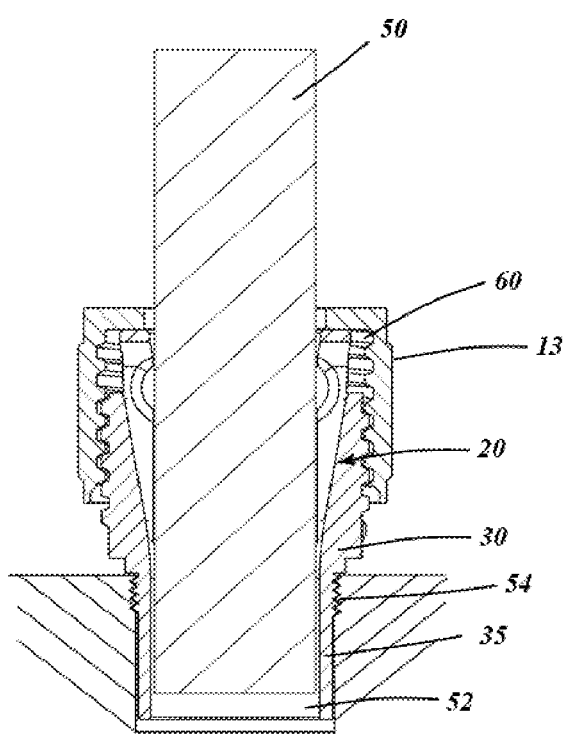
FIG. 8b is a cross-sectional view of FIG. 8a of the umbrella holding device in a hole in accordance to one, or more embodiments.
Figure 9A:
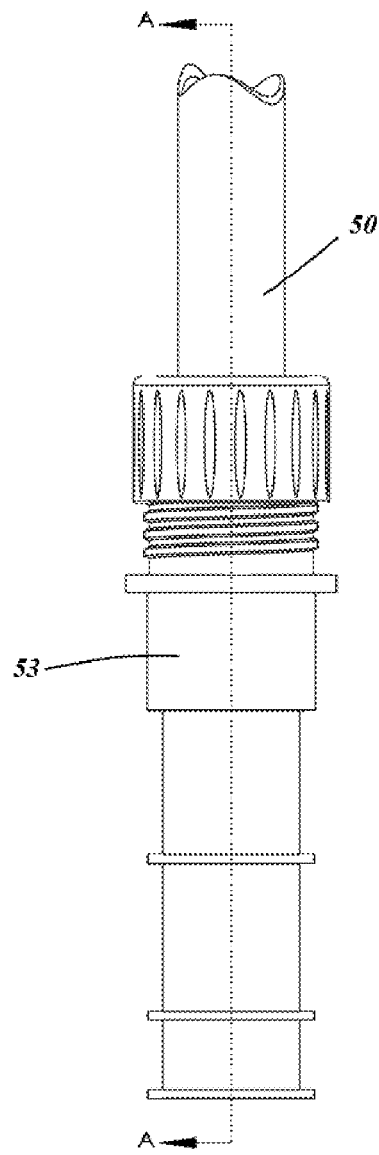
FIG. 9a is a side view of another embodiment of the umbrella holding device in accordance to one, or more embodiments.
Figure 9B:
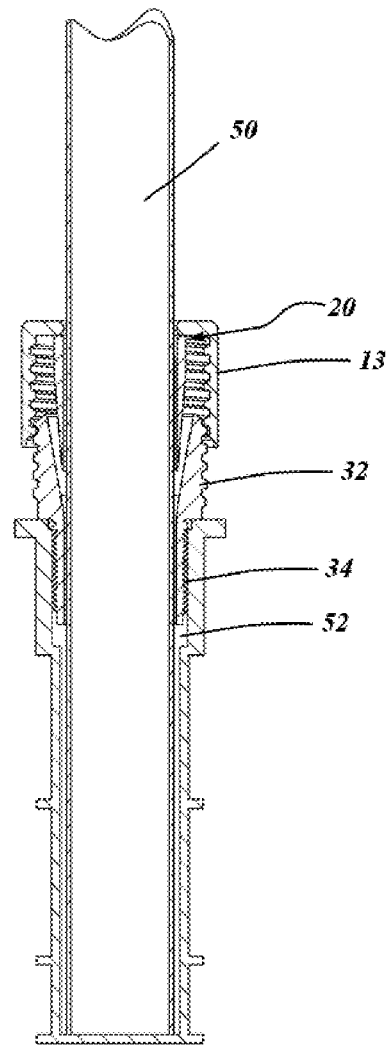
FIG. 9b is a cross-sectional view of FIG. 9a of another embodiment of the umbrella holding device in accordance to one, or more embodiments.

Referring to FIGS. 1-9b, an umbrella holding device for securing an umbrella in a hole 52 on a porch, patio or pool deck is shown generally at 10 wherein a hole can have an umbrella hole insert 53. The hole 52 location is not limited to a porch, patio or pool deck, the hole can be in but not limited to, such as, for example, wooden deck, lawn or garden, concrete pad, sand or beach area, campground site, balcony or terrace, or the like.

The umbrella holding device 10 can comprise a grip nut 12 that can have a grip exterior 13 and a grip interior 60 that defines a grip hollow defining a shoulder diameter 62 wherein the grip interior is at least partially threaded with a grip nut threads 18. The grip nut 12 can have a grip top 14 and a grip bottom 19. The grip top 14 can have a first thru hole 16 and the grip bottom 19 can have the grip nut threads 18 wherein the first through hole and the shoulder diameter 62 can define a shoulder 15. The grip nut 12 can be any suitable size or shape, but in the preferred embodiment the grip nut is circular or in other embodiments the grip nut can be such as, for example, circular, square, rectangular, oval, hexagonal, or the like in shape. The grip nut 12 can be made from such as, for example, stainless steel, plastic, carbon fiber, composite material, ceramics, wood, or the like.

The grip exterior 13 can have at least one grip extrusion 17 spaced evenly or unevenly around the grip exterior. The grip extrusion 17 can extend from the grip exterior 13 of the grip nut 12 wherein the grip extrusion can be such as, for example, a long narrow rectangle grip, hill knurled, mountain knurled, triangular grip or the like. The transition between the first hole 16 and the first threads 18 can form a shoulder 15. The grip nut threads 18 can be such as, for example, acme threads, national pipe thread, British standard pipe threads, ISO metric screw thread or the like. In other embodiments, the grip nut 12 can have a locking mechanism such as a push tab that can slidably coupled to the grip wherein the locking mechanism can prevent unintended loosening of the grip nut once secured in place.

In embodiments, the base 30 can have a grip portion 40 on a grip end and a patio extension 42 on a patio end, wherein the patio extension can be configured to be received in the patio hole 52 and can have at least partially threaded exterior 34 configured to secure the base in the patio hole and wherein the grip portion has an at least partially threaded exterior portion 32 configured to engage the grip nut thread 18 and a base interior 36 that can be such as, for example, substantially funnel shaped, conical funnel, bell-shaped funnel, stepped funnel, tapered funnel, cylindrical funnel or the like. The base interior 36 can extend to a base hole wherein the base hole can be sized to except varying diameters of umbrella poles.

The base 30 can have the at least partially threaded exterior 34 extending from the grip portion 40 to substantially near the at least partially threaded exterior 34 section. The at least partially threaded exterior 34 can partially extend from the at least partially threaded exterior portion 32 towards the patio extension 42. The at least partially threaded exterior portion 32 can be the male threads and match the grip nut threads 18 wherein the grip nut threads can be female threads allowing the user to tighten the grip nut 12 onto the base 30. In certain embodiments, the patio extension 42 can have a stem 35 that can extend beyond the at least partially threaded exterior 34 and act as a support within the umbrella hole 40 within a second hole 38 extending from the base interior 36. The stem's 35 outer diameter can be such as, for example, the same diameter, smaller diameter or bigger diameter as at least partially threaded exterior portion 32 and the second hole 38 can be sized to fit varying size umbrella poles 50. The base 30 can be manufactured from such as, for example, plastic, stainless steel, Delrin, carbon steel, ceramic, composite, aluminum, or the like.

In embodiments, the umbrella holding device 10 can further comprise a ferrule 20 wherein the ferrule can have a ferrule top 22 and a ferrule bottom 24. The ferrule top 22 can have at least one tang 29 wherein the ferrule can be configured to be inserted into the grip hollow such that the ferrule top 22 engages the shoulder 15 such that when the partially threaded exterior portion 32 engages the grip nut thread 18 the ferrule is pushed into the base interior 36 and the funnel shaped base interior exerts inward pressure on the ferrule wherein the at least one tang 29 has an inward force on the umbrella pole 50 keeping the umbrella pole secured within the umbrella holding device 10 and within the hole 52.

The at least one tang 29 can have a throat 28 that leads into at least one groove 26 which can be substantially near the ferrule top 22. The ferrule bottom 24 can have at least one tang 29 extending from the ferrule bottom towards substantially near the ferrule top 22 wherein the at least one tang is substantially angled to correspond with the funnel shaped base interior 36. The at least one tang 29 can have at least one slot 27 between each tang. In the prefer embodiments, the tang can be at least four tangs 29 with four slots 27 but in other embodiments there can be such as, for example, one tang, two tangs, three tangs, four tangs, five tangs, or the like.

The groove 26 can allow for the at least one tang 29 to be easily compressed. The at least one tang 29 can be substantially angled from substantially near the groove 26. The ferrule 20 can be any suitable shape or size and can be manufactured by such as, for example, stainless steel, plastic, carbon fiber, composite material, ceramics, wood, or the like. The at least one tang 29 can be coated or covered with non-slip material such as, for example, non-slip foam, non-slip rubber, epoxy quartz, anti-slip paint, or the like. In other embodiments, the base interior 36 can be lined with a friction-enhancing material to increase its grip on either the grip nut or the ferrule 20. The ferrule 20 can be composed of a flexible material that can expands outward or compressed inward when an inward or outward pressure is exerted by the funnel-shaped base interior. The at least one tang 29 of the ferrule 20 can be configured to deform elastically under pressure from the funnel-shaped base interior 36 to securely grip the umbrella shaft 50. The ferrule 20 can be manufactured from Delrin, silicone, plastic, stainless steel, aluminum, carbon steel, ceramic, and composite. In certain embodiments, the ferrule 20 can be replaceable to accommodate different size umbrellas. The at least one tang 29 can be configured with a barb that engages with the base interior 36 to align and lock the ferrule in place when inserted.

In embodiments, the grip nut 12 can be removably coupled to the base 30 wherein the ferrule 20 can be placed between the grip nut and the base. The grip nut 12 can compress the ferrule 20 into the base 30 wherein as the grip nut can be screwed onto the base the base interior 36 with a funnel shape decreases the inner diameter size pushing against the tangs 29 which pushes against the umbrella's pole 50 tightening the umbrella holding device 10 onto the umbrella pole. The patio, porch or pool deck can have a hole 52 wherein the umbrella holding device 10 can be placed into the hole and then screwed into the hole with the partially threaded exterior 34 wherein the partially threaded exterior allows the user to tighten the base into the patio, porch, umbrella sleeve or pool deck. Once the user has tightened the base 30 into the hole 52 the user can place the grip nut 12 and the ferrule 20 on the umbrella pole 50 and then place the umbrella into the base into the second hole 38. The user can then tighten down the grip nut 12 onto the base 30 wherein the shoulder 15 can be pushed against the ferrule top 22 wherein the grip nut can compress the ferrule 20 onto the pole 50 wherein the umbrella holding device 10 can securely hold the pole 50 in place. The hole in the porch, patio or pool deck can hold the pole 50 which can be such as, for example, umbrella pole, volleyball pole, basketball pole, tetherball pole, or the like.

In certain embodiments, the umbrella holding device 10 can further comprise a drainage channel 37 within the base 30 to allow water to escape from the patio hole, preventing accumulation around the umbrella pole and the threaded exterior portion of the grip portion 40 can be a self-locking thread to prevent loosening due to vibration or wind movement.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

I claim:

1. An umbrella holding device for securing an umbrella in a hole on a patio, porch or pool deck, the holding device comprising:
    a grip nut having a grip exterior, a grip interior that defines a grip hollow, and a shoulder extending from the grip exterior into the grip hollow defining a shoulder diameter wherein the grip interior is at least partially threaded with a grip nut thread;
    a base having a grip portion on a grip end and a patio extension on a patio end, wherein the patio extension is configured to be received in the patio hole and has an at least partially threaded exterior configured to secure the base in the patio hole and wherein the grip portion has an at least partially threaded exterior portion configured to engage the grip nut thread and a base interior that is substantially funnel shaped; and
    a ferrule having a ferrule top, at least one tang, the ferrule configured to be inserted into the grip hollow such that the ferrule top engages the shoulder such that when the threaded exterior portion engages the grip nut thread the ferrule is pushed into the base interior and the funnel shaped base interior exerts inward pressure on the ferrule wherein the funnel-shaped base interior is lined with a friction-enhancing material to increase the grip on the ferrule.

2. The umbrella holding device according to claim 1, wherein the at least one tang extends from the ferrule top to substantially near a ferrule bottom.

3. The umbrella holding device according to claim 2, wherein the ferrule has a throat and has at least one groove substantially near the throat.

4. The umbrella holding device according to claim 1, wherein the at least one tang is substantially angled to correspond with the funnel shaped base interior.

5. The umbrella holding device according to claim 1, wherein the ferrule is composed of a flexible material wherein the at least one tang compresses inward when an inward pressure is exerted by the funnel-shaped base interior as the ferrule is pushed into the base interior.

6. The umbrella holding device according to claim 1, wherein the tangs of the ferrule are configured to deform elastically under pressure from the funnel-shaped base interior to securely grip the umbrella shaft.

7. The umbrella holding device according to claim 1, wherein the grip exterior has at least one grip extrusion spaced around the outer circumference of the grip.

8. The umbrella holding device according to claim 1, wherein the ferrule is replaceable to accommodate different size umbrellas.

9. The umbrella holding device according to claim 1, wherein the grip nut and the base are manufactured from at least one of plastic, stainless steel, aluminum, ceramic, and composite.

10. The umbrella holding device according to claim 1, wherein the ferrule is manufactured from at least one of silicone, plastic, stainless steel, aluminum, ceramic, and composite.

11. The umbrella holding device of claim 1, wherein the threaded exterior portion of the grip portion includes a self-locking thread to prevent loosening due to vibration or wind movement.

12. The umbrella holding device of claim 1, wherein the device further comprises a drainage channel within the base to allow water to escape from the patio hole, preventing accumulation around the umbrella pole.

* * * * *